US008554056B2

(12) United States Patent
Lee

(10) Patent No.: US 8,554,056 B2
(45) Date of Patent: Oct. 8, 2013

(54) SYSTEMS AND METHODS FOR INTEGRATING INTERACTIVE FEATURES INTO MULTIPLE MEDIA CONTENT SOURCES

(75) Inventor: Hsieh-Te Lee, Taoyuan (TW)

(73) Assignee: Cyberlink Corp., Shindian, Taipei (TW)

( * ) Notice: Subject to any disclaimer, the term of this patent is extended or adjusted under 35 U.S.C. 154(b) by 1141 days.

(21) Appl. No.: 12/241,528

(22) Filed: Sep. 30, 2008

(65) Prior Publication Data

US 2010/0080384 A1 Apr. 1, 2010

(51) Int. Cl.
*G11B 27/00* (2006.01)

(52) U.S. Cl.
USPC ........... 386/280; 715/723; 715/724; 715/725; 715/726

(58) Field of Classification Search
USPC .................................................. 386/52, 280
See application file for complete search history.

(56) References Cited

U.S. PATENT DOCUMENTS

| 2003/0194211 | A1 | 10/2003 | Abecassis | |
|---|---|---|---|---|
| 2005/0108560 | A1* | 5/2005 | Han et al. | 713/193 |
| 2008/0091845 | A1* | 4/2008 | Mills et al. | 709/246 |
| 2008/0112683 | A1* | 5/2008 | Lin et al. | 386/52 |

FOREIGN PATENT DOCUMENTS

| EP | 1103974 A | 5/2001 |
|---|---|---|
| EP | 1879195 A | 1/2008 |
| WO | 98/06098 A | 2/1998 |

OTHER PUBLICATIONS

Jung et al, Block-sliced DRM system for secure Multi-Media Contents, Oct. 2007, vol. 7 No. 10, pp. 234-241.*
Extended European Search Report for Patent Application No. EP 09 153543.5. Feb. 23, 2010.
Intel Corporation and Others, "Advanced Access Content System (AACS)—Introduction and Common Cryptographic Elements (Revision 0.91)" Feb. 17, 2006. Retrieved from the Internet. URL: http://web.archive.org/web/20060319164126/www.aacsla.com/specification/specs091/AACS_Spec_Common_0.91.pdf>.
Intel Corporation and Others, "Advanced Access Content System (AACS) Blue-ray Disc Pre-recorded Book Revision 0.921" Jun. 6, 2008. Retrieved from the Internet. URL: http://www.aacsla.com/specifications/AACS_Spec_BC_Prerecorded.921.pdf>. pp. 21-42, pp. 49-84, and Figures 3.3, 4.3-4.14, 5.1.
European Search Report for Patent Application No. EP 09 153543.5. Nov. 20, 2009.

* cited by examiner

*Primary Examiner* — Ghazal Shehni

(74) *Attorney, Agent, or Firm* — McClure, Qualey & Rodack, LLP

(57) ABSTRACT

One embodiment, among others, includes a method for editing video. The method comprises receiving a plurality of media files and receiving specified special effects corresponding to each of the plurality of media files. Based on the received plurality of media files and the specified special effects for each of the plurality of media files, a single output is generated whereby the special effects are incorporated and where the plurality of media files are unmodified.

41 Claims, 10 Drawing Sheets

SYSTEMS AND METHODS FOR INTEGRATING INTERACTIVE FEATURES INTO MULTIPLE MEDIA CONTENT SOURCES

TECHNICAL FIELD

The present disclosure generally relates to multimedia content and more particularly, relates to integrating interactive features into multiple sources of media content.

BACKGROUND

With the vast array of video editing tools available, many people can readily edit existing video and incorporate special effects to customize videos and to produce stylish graphics. Today, media content such as movies, television shows, and music videos are made widely available in DVD format. One of the appealing features of DVDs and other formats such as BLU-RAY Disc and HD DVD (High Definition Digital Video Disc) is the interactive menus offered on such storage mediums in addition to the main content itself.

These interactive menus have become an integral part in fully enjoying media content, such as a movie or television show on a DVD. Consumers can, for example, select specific chapters to view, set audio/video options (language for the movie to be played in, subtitles, etc.), and watch additional footage such as a "behind-the-scenes" look in making the movie. Some DVDs even offer "alternate endings" where consumers can actually select an ending of their choice should they not like the original ending. Today, most personal desktop and laptop computers are sold with one or more DVD-ROM players built in, thereby allowing customized effects to be incorporated. One common problem with traditional video editing solutions, however, is the degree of time and complexity involved in the overall editing process. The degree of complexity may increase if an individual desires to edit more than one DVD.

SUMMARY

Briefly described, one embodiment, among others, is an apparatus for incorporating special effects into media content. The apparatus comprises a media reader configured to receive one or more media content, an editor configured to receive specified special effects for the one or more media content, and a combiner for generating an output based on the one or more received media content and the received special effects.

Another embodiment is a method for incorporating special effects into media content. In accordance with such embodiments, the method comprises receiving one or a plurality of media files and receiving special effects corresponding to each of the plurality of media files. Based on the received plurality of media files and the special effects specified for each of the plurality of media files, a single output is generated.

Another embodiment is a system for incorporating special effects into media content. The system comprises at least one optical disc drive (ODD) configured to receive one or more media content stored on optical storage mediums, a network interface configured to receive media content over a network and store managed copies of the received media content locally, wherein managed copies comprise controlled copies of the media content. The system further comprises a processor configured to receive specified special effects for the one or more media content, wherein the processor further configured to generate a single output on a display based on the one or more received media content and the specified special effects Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
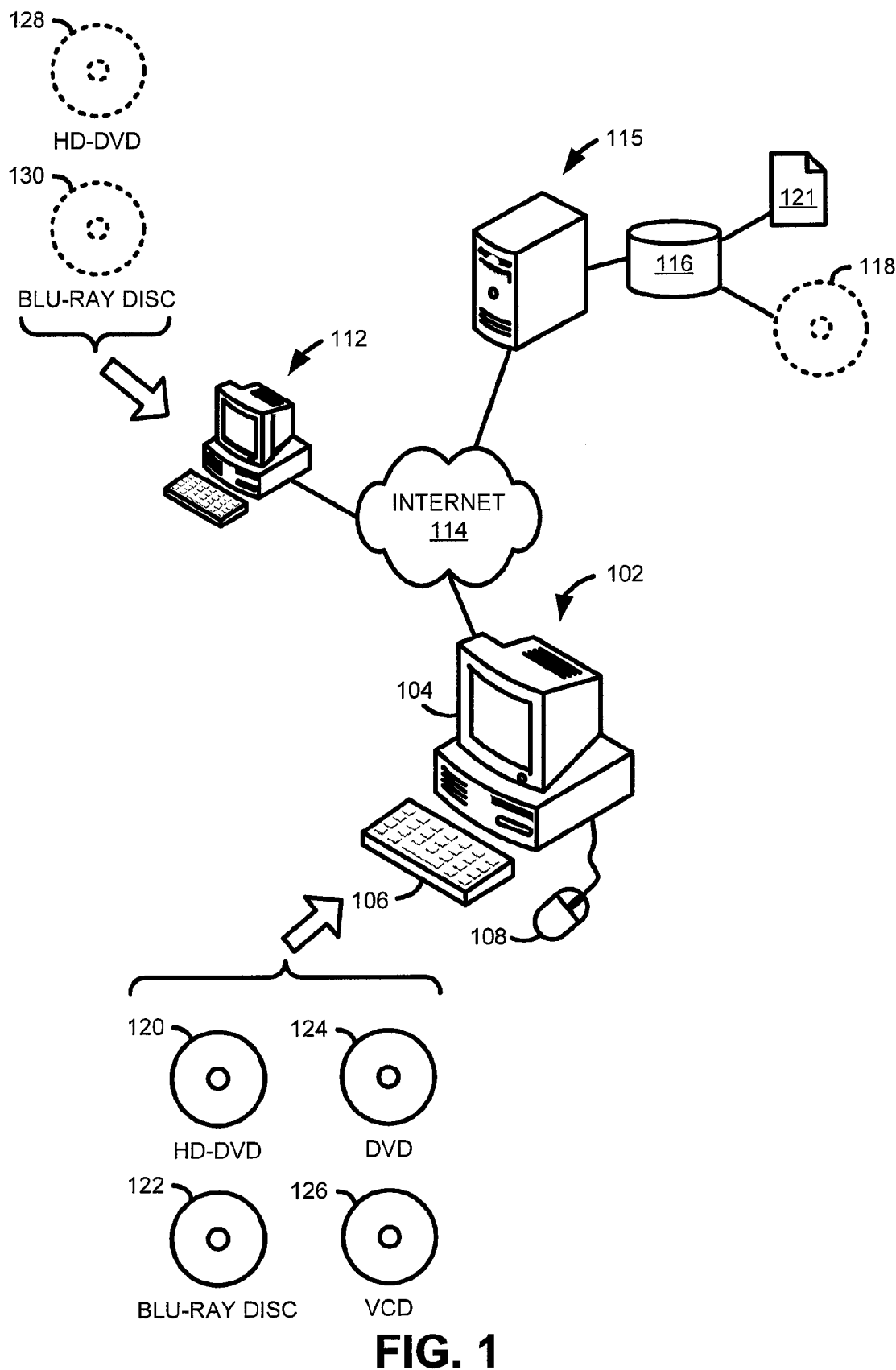
FIG. 1 depicts a top-level diagram of an apparatus for incorporating customized effects from multiple media content sources for later playback.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As generally known, subtitles refer to the text displayed in connection with video (e.g., near the top or bottom of the display area) which convey the dialog taking place in the video. Subtitles may be a form of translation in a particular language or simply a textual rendering of the dialog in the same language in which the video/audio portions were recorded. In this regard, subtitles offer viewers an alternative means for following the dialog taking place within the video. For many viewers, subtitles or closed captioning plays an integral part in being able to fully experience a particular film or television program. For some viewers, closed captioning is an important means for allowing them to follow dialog that takes place during the course of a film. For others, subtitles allow viewers to follow dialog in another language.

Video content stored on such media as DVDs (Digital Video Disc), for example, typically offer consumers the option to view the video while listening to the audio portion in a language other than the language originally associated with the video. For example, consumers may elect to view a movie originally recorded in English while listening to the audio portion dubbed in Mandarin. Furthermore, consumers usually have the option of viewing the video content while viewing subtitles in a selected language. As an example, it is possible to view a video while listening to the audio portion dubbed in French and while displaying subtitles in Spanish. In some instances, a viewer may wish to incorporate customized subtitles into a movie. The customized subtitles may either be displayed in conjunction with the original subtitles or displayed in place of the original subtitles. Customized subtitles may be useful, for example, for inserting customized commentary into a movie.

An individual may also want to incorporate customized graphics into a particular scene during playback of media content from a DVD, for example. Such customized graphics may include a border or other graphics such as an arrow or circle in the viewing area of the display to emphasize a particular object or individual within a particular scene. An individual might also elect to incorporate customized audio either to be played in conjunction with the original soundtrack or in place of the original soundtrack of the media content.

An individual may further wish to incorporate special effects from multiple sources of media content. For example, an individual might want to create a customized compilation involving all the movies within a series, such as "STAR WARS Episode I" to "STAR WARS Episode VI," for example. While desktop computers are a popular means for editing media content, many systems typically come equipped with a single optical disc drive. While an individual might add another optical drive, it is generally not feasible from a cost perspective to add an optical drive for each DVD to be edited. While an individual might be able to store digital copies of media content on the hard drive of the desktop computer, the massive storage requirements for high resolution media content can become an issue over time.

Embodiments described herein provide individuals with a means for editing media content from multiple media content sources without the need for multiple optical drives and without the need for expanding local storage capabilities. In accordance with some embodiments, an editing apparatus is described for incorporating special effects into media content. The editing apparatus may comprise a media reader configured to receive one or more media content, an editor configured to receive specified special effects for the one or more media content, and a combiner for generating an output based on the one or more received media content and the received special effects.

Reference is now made to FIG. 1, which depicts a top-level diagram of a system for identifying scenes within a video. For some embodiments, a system for identifying scenes within a video may be incorporated in an editing apparatus 102, which may be, for example, a computer workstation or a laptop. The editing apparatus 102 may include a display 104 and input devices such as a keyboard 106 and a mouse 108. Furthermore, the editing apparatus 102 may be configured to provide a user interface, which a user utilizes to select one or more movie titles to edit. The user interface also allows a user to input special effects. For some embodiments, the user may select multiple movies to edit via an input device such as a mouse, for example.

As illustrated in FIG. 1, the editing apparatus 102 may be further configured to read multimedia content stored in various formats or stored on various types of storage media. As non-limiting examples, the editing apparatus 102 is capable of reading media content encoded in such formats that include, but are not limited to, Digital Video Disc (DVD) 124, video CD (VCD) 126, High Definition DVD (HD-DVD) 120, and BLU-RAY Disc 122. In accordance with exemplary embodiments, the editing apparatus 102 may also be configured to read multimedia content from managed copies of an HD-DVD 128 or a BLU-RAY Disc 130, for example.

The phrase "managed copy" generally refers to authorized copies of multimedia content. These authorized copies are protected by AACS (Advanced Access Content System), which is a standard relating to content distribution and digital rights management. The editing apparatus 102 is configured to obtain authorization for creating or downloading a managed copy by contacting a designated server on the Internet. To protect against unauthorized distribution of media content, managed copies are protected by DRM (digital rights management) such that uncontrolled copying is prevented. In accordance with various embodiments, the editing apparatus 102 may utilize managed copies for different purposes such as creating an exact duplicate of a movie title onto a recordable disc as a backup, creating a full-resolution copy for storage on a media server, and creating a scaled-down version of a movie title for playback on a portable device.

As described earlier, the media file may be encoded in any of a variety of audio/video formats including, but not limited to: VOB (video object) files, MOV files, AVI files, WMV files, and MPEG files. It should also be noted that a single received media content may contain multiple media files. For example, one media content (e.g., a DVD) may contain multiple VOB files.

In accordance with various embodiments, managed copies of media content 128, 130 may be obtained based on the following steps. First, identification data associated with the media content is retrieved. As a non-limiting example, the identification data may be a series number associated with the media content. The series number may be useful in tracking the number of managed copies of a particular movie title that exist. This series number may be determined and issued by a content provider, for example. Furthermore, the content provider may issue the series number at the time of transaction when the user purchases a managed copy of the media content.

Upon receiving the identification data (e.g., series number), the content provider authorizes transmission of the managed copy to the editing/playback device. Transmission of the managed copy 128, 130 may be performed via downloading or streaming over the Internet 114. Transmission may also involve providing a storage medium storing the managed copy. Upon receiving the managed copy (via downloading or by receiving a storage medium), the user stores the managed copy locally in a local hard drive, for example. Alternatively, the user may burn the managed copy onto an optical disc.

The managed copies 128, 130 may be stored locally on the editing apparatus 102 or remotely on another system 112 such as a computer desktop. Managed copies 128, 130, 118 may also be stored in a database 116 (e.g., a media library) on a server 115 maintained by a media content provider, for example. The server 115 may further store digital copies 121 of media content, which may also be stored locally on the editing apparatus 102. Emphasis should be placed on the fact that the media content to be edited may be stored locally on the editing apparatus 102 or stored in a distributed fashion in remote locations, or a combination of both.

As discussed earlier, media content may be retrieved through other means other than managed copies. For some embodiments, media content 120, 122, 124, 126 may be read from a local storage medium or retrieved from a content server. In such instances, authentication between the editing device 102 and the content server (or between the editing device and the local storage medium) takes place. This ensures that the editing device 102 is authorized to perform playback of the content and thus prevents playback using an unauthenticated device, in addition to playback of unauthenticated content. Based on authentication performed between the editing/playback device 102 and the content itself, a decryption key is generated for playback purposes. For some embodiments, digital rights management (DRM) techniques as know by those skilled in the art may be deployed, such as Advanced Access Content System (AACS), Content Scrambling System (CSS), Video Content Protection System (VCPS), Windows Media DRM (WMDRM), Content Protection for Recordable Media and Pre-Recorded Media (CPRM/CPPM), etc.

By way of background, the content on a local storage medium (such as a DVD) may generally be categorized into two categories—the main multimedia content itself and volume info relating to the disc. Under the AACS standard, this volume info is referred to as the Media Key Block (MKB). The MKB allows compliant players (e.g., software DVD players that have incorporated a license under the AACS LA) to calculate a "secret" key using device keys embedded into the players. The AACS scheme encrypts content under one or more title keys using the Advanced Encryption Standard (AES). These title keys are derived from a combination of a media key and other pieces of information, including the volume ID associated with the disc. Even if an unauthorized user tampers with the system and manages to retrieve one of the title keys, this only allows the user to decrypt a portion of the content.

Referring back to FIG. 1, the editing apparatus 102 is configured to receive the media content 120, 122, 124, 126, 128, 130, 121, 118 to be edited and output the media content for a user to view. Using the editing apparatus 102, the user may select one or more sources of media content. In some embodiments, the editing apparatus 102 may be further coupled to a network, such as the Internet 114. For such embodiments, media content may be downloaded from another computing device 112 or server 115 also coupled to the Internet 114. The user may then utilize the editing apparatus 102 to select scenes within the one or more media sources for editing. For alternative embodiments, only scenes of interest are downloaded in order to avoid downloading the media content in its entirety. Special effects specified by the user may be uploaded to another computing device 112 for playback purposes. For example, a user may incorporate a series of customized subtitles and audio effects and upload these customized effects for another user to incorporate during playback of the same video (e.g., a copy of the video title).

Figure 2:
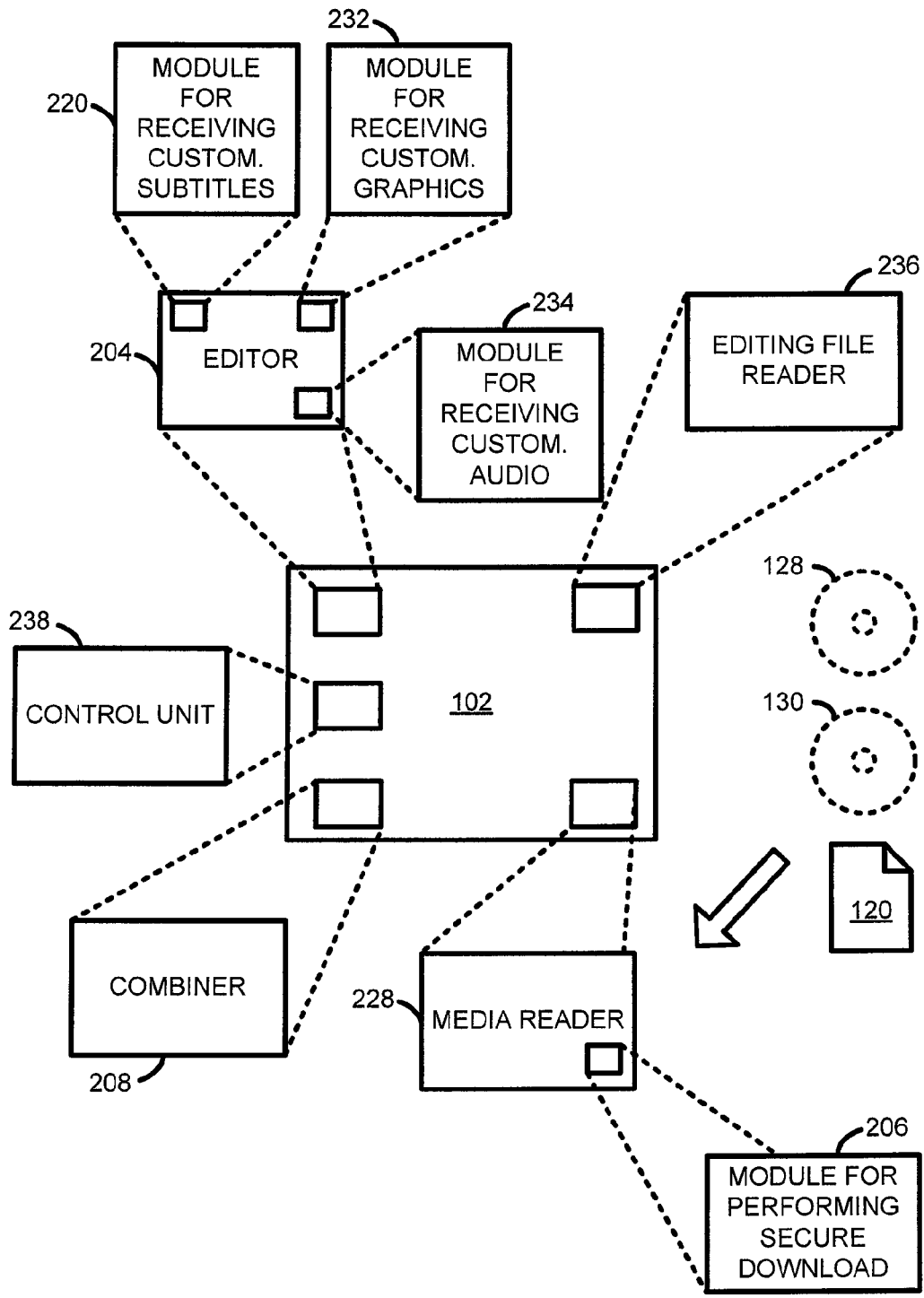
FIG. 2 is a block diagram illustrating various components of the apparatus in FIG. 1.

Reference is now made to FIG. 2, which is a block diagram illustrating various components of the apparatus in FIG. 1. For some embodiments, the editing apparatus 102 may comprise a media reader 228, an editor 204, and a combiner 208. The media reader 228 is configured to read media content 128, 130, 120 and further comprises a module 206 for performing secure downloads of managed copies, for example, which are stored remotely. The combiner 208 is configured to consolidate the outputs from the one or more sources of media content during playback. In particular, after special effects have been specified for the one or more sources of media content, the combiner 208 generates an output to a display, for example, for the user or others to view. In accordance with some embodiments, the editing apparatus 102 may also comprise an editing file reader 236 configured to read an editing file that stores special effects as well as an association, which specifies a particular segment within particular media content in which to incorporate the special effects. The editing apparatus 102 also comprises a control unit 238 configured to monitor execution of the other components described above. The function of the control unit 238 is further described later.

The above exemplary formats are merely examples, and it is intended that the various embodiments described herein cover any type of multimedia content in its broadest sense. It should be emphasized that in accordance with exemplary embodiments described herein, the original contents of the media content are not changed. For purposes of this disclosure, the phrases "remix file" and "editing file" may be used interchangeably and generally refer to a file associated with particular media content that contains special effects to be incorporated into the associated media content. In this regard, a remix file or editing file is created that stores editing commands or specified special effects to be incorporated into a particular title. The remix file/editing file also contains such information as the title, scene, and specific events within the particular scene to be modified. During playback of the media title, the editing apparatus 102 reproduces the scenes and specific events in accordance with the editing comments or special effects specified in the remix file/editing file.

The editor 205 is configured to receive customized effects to be incorporated into particular scenes of the selected media content. Accordingly, the editor 204 may comprise a module for receiving customized subtitles 220, a module for 232 for receiving customized graphics, and a module for receiving customized audio 234. The customized subtitles and customized audio may be output either in conjunction with the original subtitles/audio or in place of the original subtitles/audio.

Figure 3:
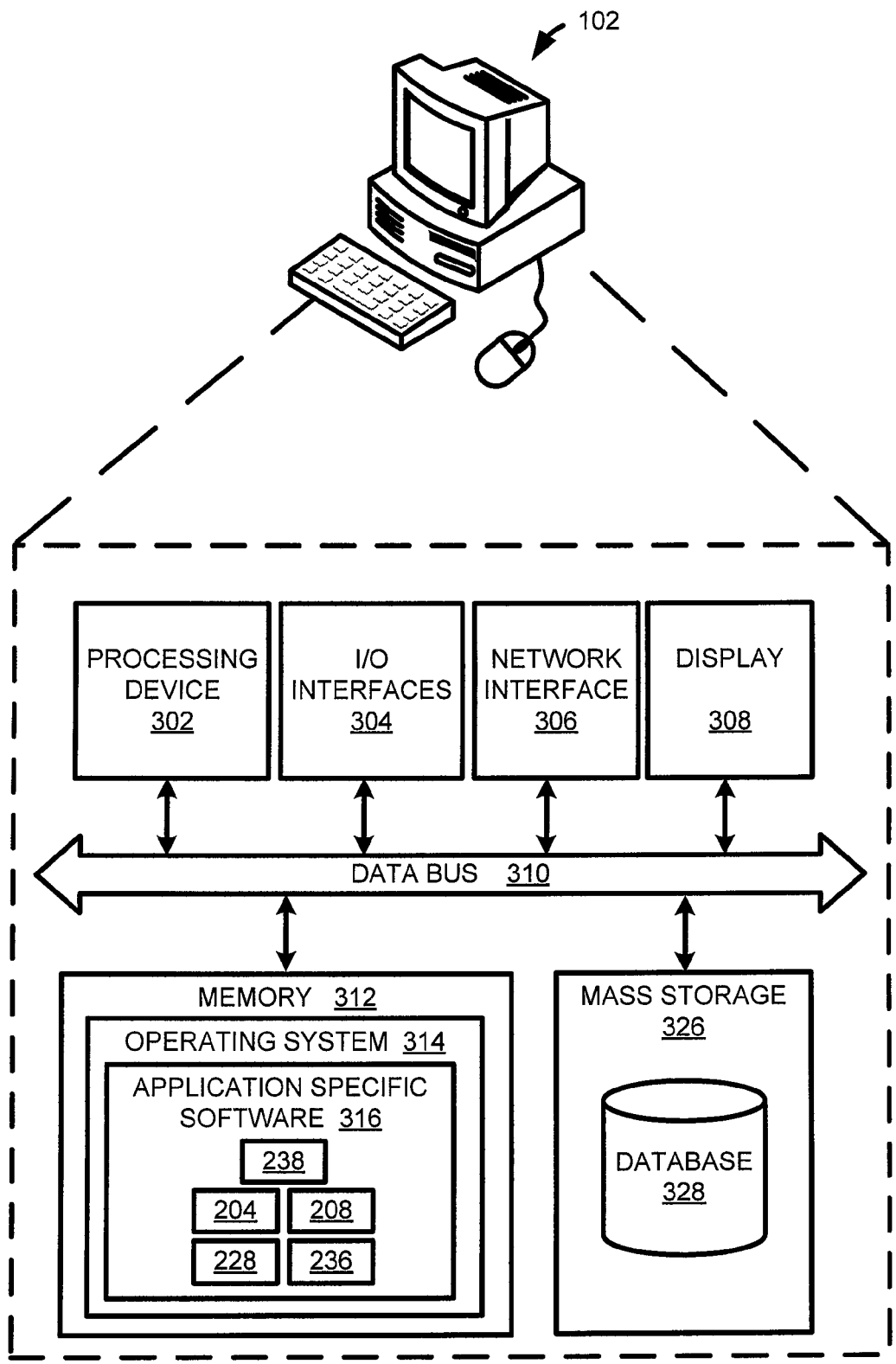
FIG. 3 illustrates an embodiment of the apparatus shown in FIG. 1 for executing the various components shown in FIG. 2.

Reference is now made to FIG. 3, which illustrates an embodiment of the editing apparatus shown in FIG. 1 for executing the various components shown in FIG. 2. Generally speaking, the editing apparatus 102 may comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, editing apparatus 102 can, for instance, comprise memory 312, a processing device 302, a number of input/output interfaces 304, a network interface 306, a display 308, and mass storage 326, wherein each of these devices are connected across a data bus 310.

Processing device 302 can include any custom made or commercially available processor, a central processing unit (CPU) or an auxiliary processor among several processors associated with the editing apparatus 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 stored on a computer readable medium for execution by the processing device 302 and may include any of the modules 204, 208, 228, 236, 238 described with respect to FIG. 2. One of ordinary skill in the art will appreciate that the memory 312 can, and typically will, comprise other components which have been omitted for purposes of brevity.

Input/output interfaces 304 provide any number of interfaces for the input and output of data. For example, where the editing apparatus 102 comprises a personal computer, these components may interface with user input device 304, which may be a keyboard or a mouse, as shown in FIG. 1. Where the editing apparatus 102 comprises a handheld device (e.g., PDA, mobile telephone), these components may interface with function keys or buttons, a touch sensitive screen, a stylist, etc. Display 308 can comprise a computer monitor or a plasma screen for a PC or a liquid crystal display (LCD) on a hand held device, for example.

In the context of this disclosure, a "computer-readable medium" stores the program for use by or in connection with the instruction execution system, apparatus, or device. The computer readable medium can be, for example, but not limited to, an electronic, magnetic, optical, electromagnetic, infrared, or semiconductor system, apparatus, or device. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

With further reference to FIG. 3, network interface device 306 comprises various components used to transmit and/or receive data over a network environment. By way of example, the network interface 306 may include a device that can communicate with both inputs and outputs, for instance, a modulator/demodulator (e.g., a modem), wireless (e.g., radio frequency (RF)) transceiver, a telephonic interface, a bridge, a router, network card, etc.). The editing apparatus 102 may further comprise mass storage 326. For some embodiments, the mass storage 326 may include a database 328 to store and manage data. Such data may comprise, for example, editing files which specify special effects for a particular movie title.

Figure 4A:
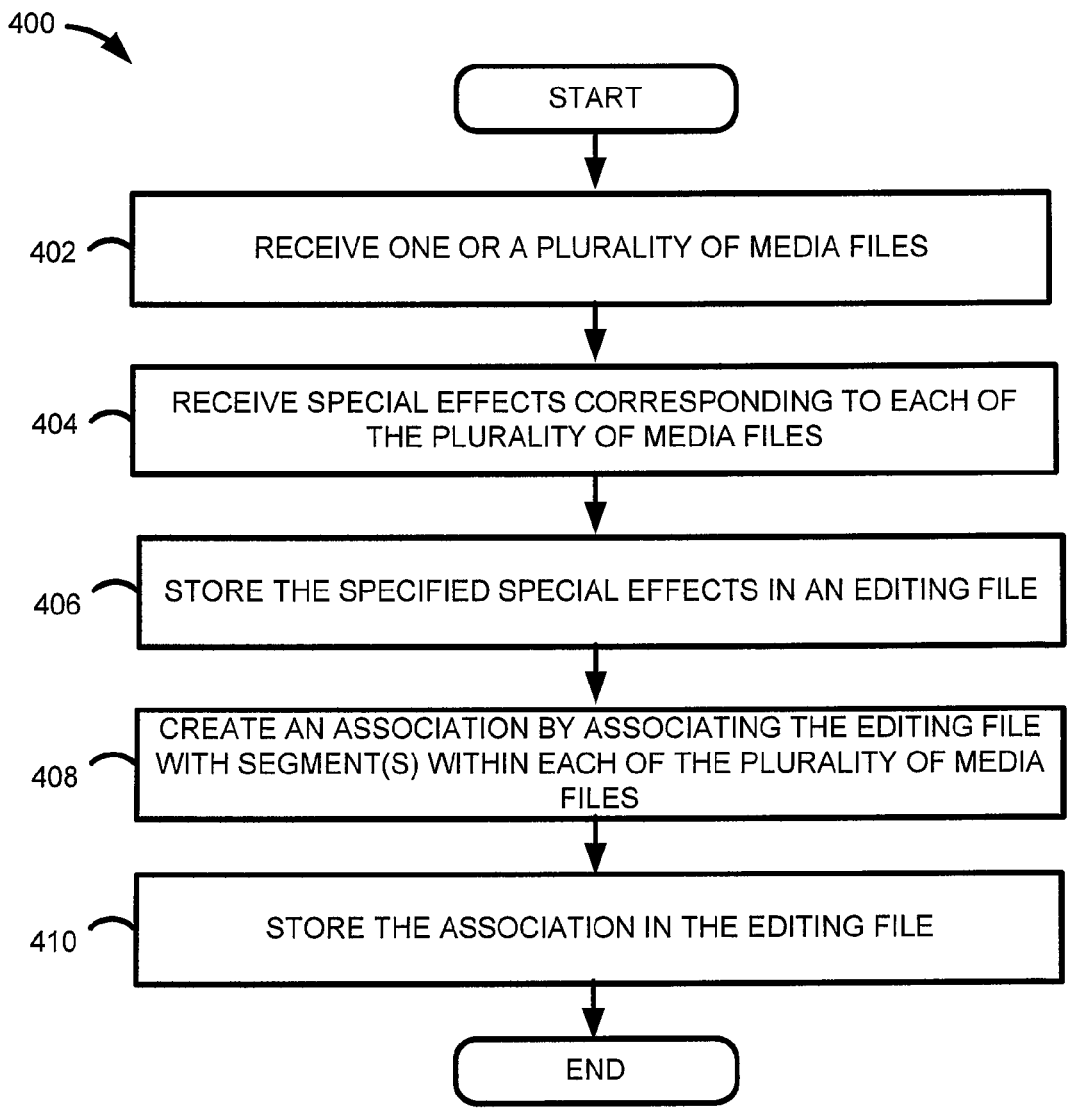
FIG. 4A depicts an embodiment of a method for editing media content from multiple sources using the apparatus depicted in FIGS. 1-3.

Reference is made to FIG. 4A, which depicts an embodiment of a method 400 for editing media content from multiple sources. In accordance with some embodiments, block 402 begins by receiving two or more media content. The media content may be stored on an optical storage medium such as an HD-DVD or a BLU-RAY Disc, for example. The received media content generally includes a title in addition to a media file. As described earlier, the media file may be encoded in any of a variety of audio/video formats including, but not limited to: VOB (video object) files, MOV files, AVI files, WMV files, and MPEG files. It should also be noted that a single received media content may contain multiple media files. For example, one media content (e.g., a DVD) may contain multiple VOB files. In block 404, special effects corresponding to each of the plurality of media files are received. In addition to specifying special effects, a user specifies certain events or segments within a particular scene of a movie and also specifies such navigation information as the starting time and end time of the segment to be edited.

In block 406, the special effects specified by the user are stored in an editing file for future playback purposes. Furthermore, the specified special effects are associated with certain segments within the movie. A segment may refer to any portion within the movie such as a particular scene, event, transition event, etc. In this regard, an association between the editing file and the segments in which the received special effects are to be incorporated is created and stored in the editing file (blocks 408, 410).

Figure 4B:
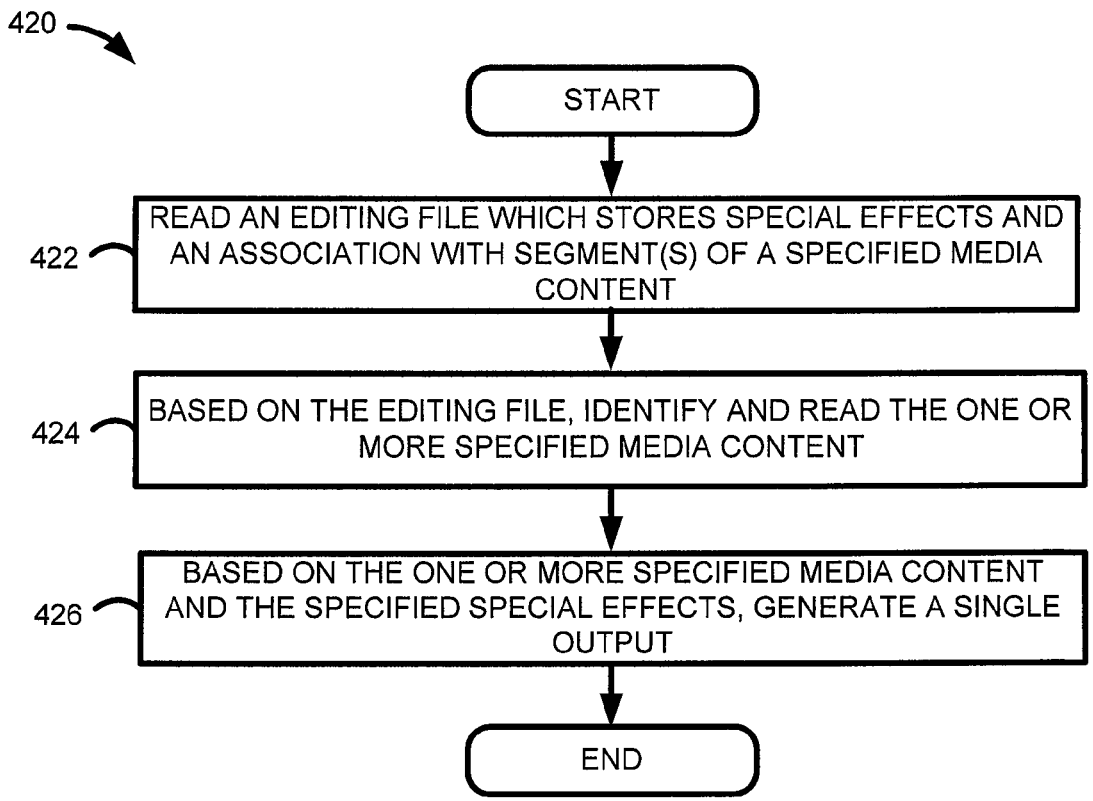
FIG. 4B depicts an embodiment of a method for reproducing media content from one or more sources using the apparatus depicted in FIGS. 1-3.

Reference is now made to FIG. 4B, which depicts an embodiment of a method 420 for reproducing media content from one or more sources based on an editing file. The method 420 for reproducing media content may be performed using the same editing apparatus 102 depicted in FIG. 1. Beginning in block 422, an editing file is read. As discussed earlier, an editing file generally stores special effects in addition to a movie title identifier such as a fingerprint for identifying the media content. Furthermore, the editing file may also include one or more associations with one or more segments in the media content to be edited. Based on the contents of the editing file, one or more media content specified in the editing file are identified and read (block 424). In block 426, based on the one or more media files and the specified special effects for each of the media files, a single output is generated (block 426). In particular, the edited events are incorporated into the scene based on the timing specified by the user during playback. The edited events may involve audio content, video content, and subtitles. Non-limiting examples include customized audio specified by the user (to replace the original audio), still pictures, PIP (picture-in-picture), and customized video (to replace the original video).

The editing apparatus 102 depicted in FIG. 1 searches and receives the media content according to a unique title/identifier embedded within the remix file/editing file. The media content may be received from one or more local disk drives or optical disk drives (or a combination thereof). As described earlier, the media content may also be received from a content server 115. Upon receiving the media content, the editing apparatus 102 depicted in FIG. 1 further reproduces the desired segments/scenes according to navigation information and special effects associated with this content. In some cases, there may be many events within the scene to be edited. The editor 204 further defines timing information related to certain events within the scene.

Figure 5A:
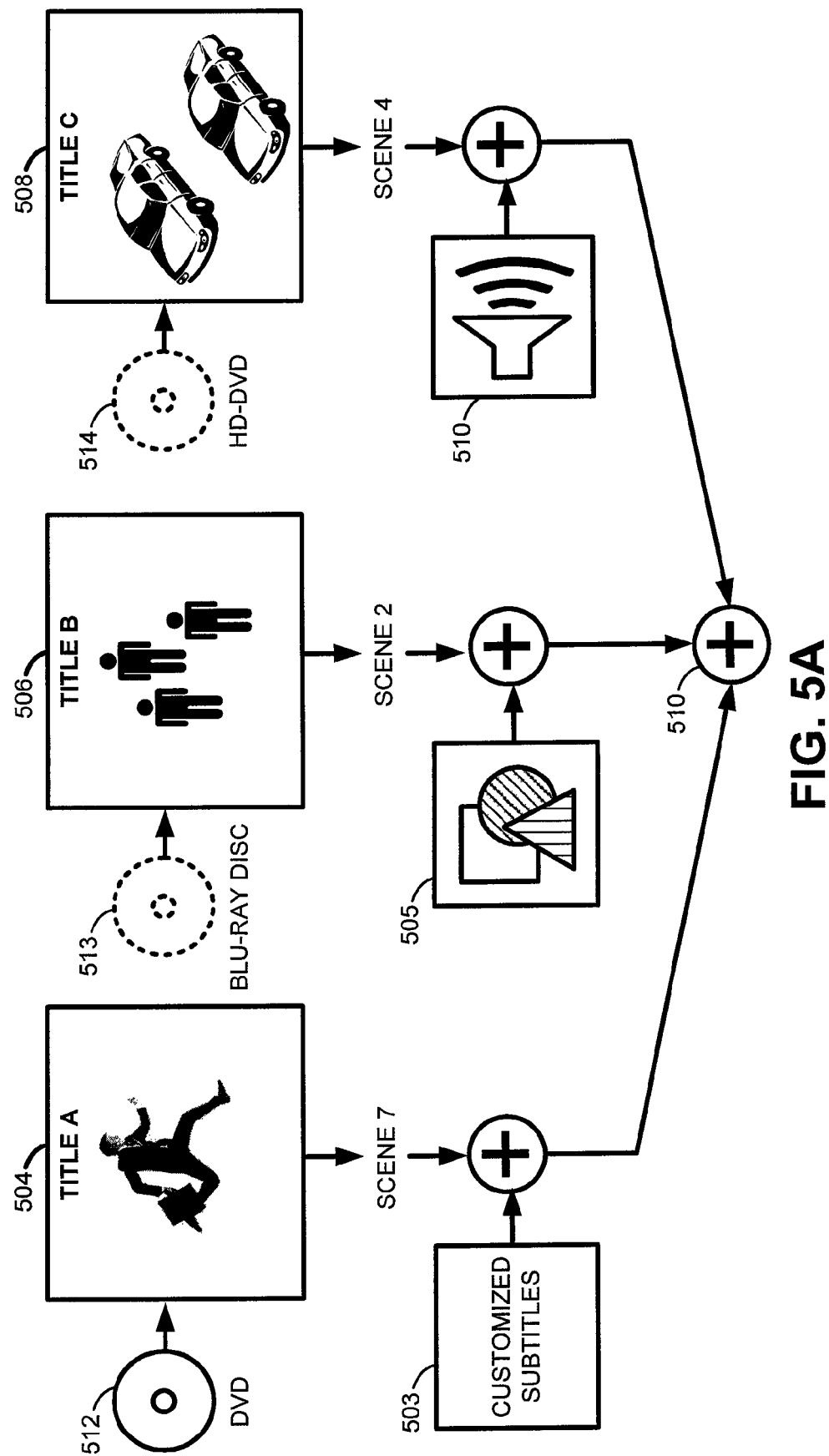
FIGS. 5A-B illustrate the step shown in FIG. 4B for generating a single, combined output from multiple sources and incorporating special effects.
Figure 5B:
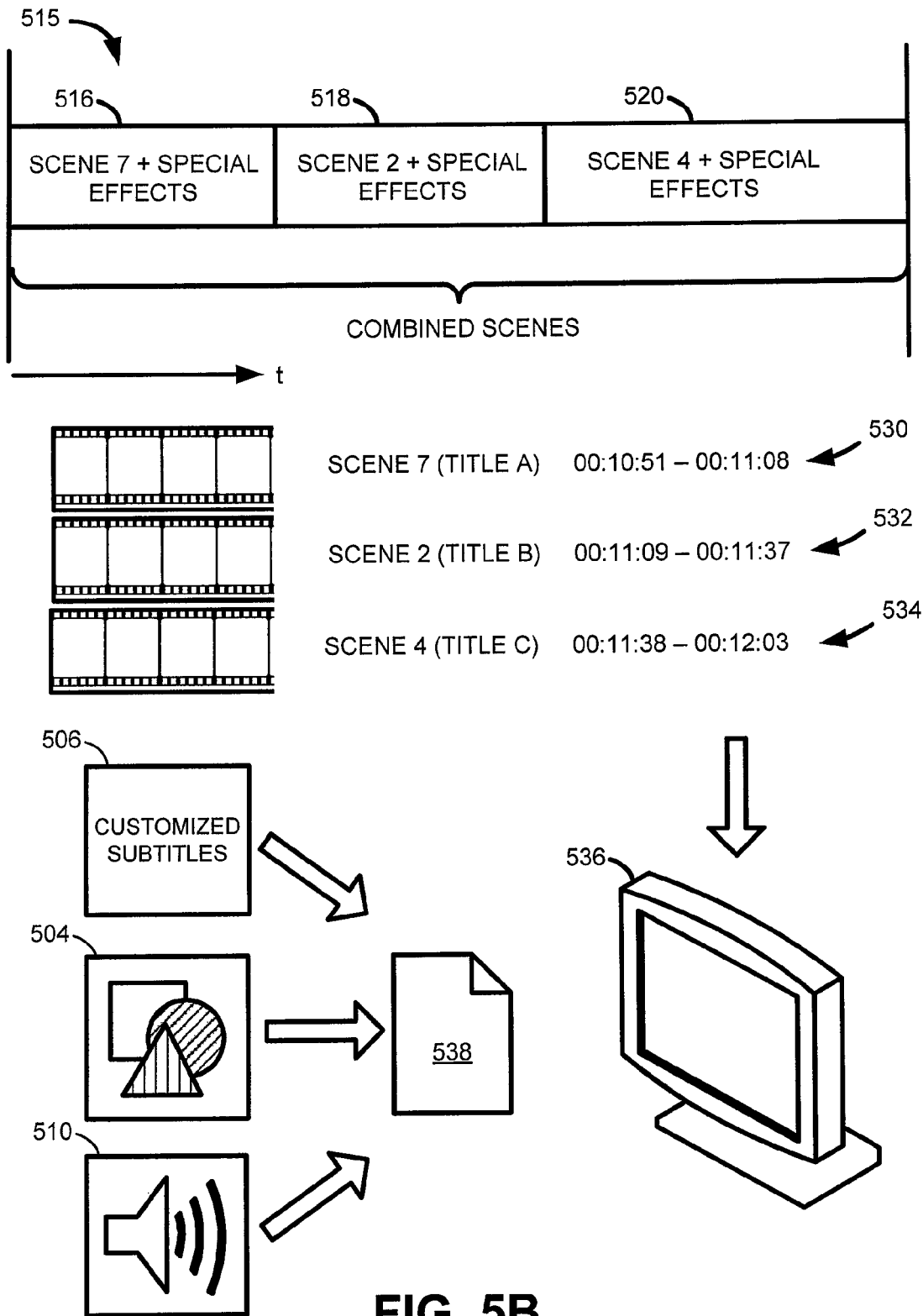

FIGS. 5A-B illustrate the step shown in FIG. 4B for generating a single, combined output from multiple sources and incorporating special effects. As described earlier, a movie title (i.e., media content) generally consists of multiple VOB (video object) files. Each VOB file includes audio data packs, video data packs, and navigation information. During playback, the editing apparatus 102 locates the VOB files of the content according to the title/unique identifier of the contents. The editing apparatus 102 then finds the corresponding VOB file in addition to the corresponding audio data packs/video data packs within the corresponding VOB file according to the navigation information of the editing file. The video data packs and audio data packs are decoded during playback. Events are also decoded and played back based on the specified special effects and associations within the editing file. Furthermore, the editing apparatus 102 may locate the VOB files of the media content to be played back from any number of sources, including, but not limited to: the local disk drive, an optical disk drive, or via the Internet.

FIG. 5A shows three media content sources (Title A 504, Title B 506, Title C 508) to be edited. As described earlier, Titles A-C 504, 506, 508 may be in various formats, including DVD, HD-DVD, BLU-RAY Disc, etc. Moreover, the titles 504, 506, 508 may be managed copies of a DVD, HD-DVD, BLU-RAY Disc stored locally or remotely. In the non-limiting example shown in FIG. 5A, Title A is read from a DVD 512 using a local optical disc drive in the editing apparatus 102. Title B is read from a managed copy of a BLU-RAY Disc 513, which is stored locally on the editing apparatus 102. Title C is read from a managed copy of a HD-DVD 514, which has been downloaded from the server 115 depicted in FIG. 1.

Upon selection of the titles 504, 506 508 to be edited, the user selects one or more scenes from each title 504, 506, 508 in which to incorporate customized effects. The customized effects may comprise, for example, subtitles, graphics, and audio content. In the example shown in FIG. 5A, scene 7 is selected by the user from Title A 504 to be edited, scene 2 from Title B 506, and scene 4 from Title C 508. The user specifies customized effects 503, 505, 510 to be incorporated into the respective titles 504, 506, 508 upon playback. In the illustration shown, the user elects to incorporate customized subtitles 503 into scene 7 of Title A 504. The user may use this feature, for example, to insert the commentary authored by the user in the form of subtitles into the media content. For Title B 506, the user incorporates customized graphics 505 into scene 2 of Title B 506. For Title C 508, the user incorporates customized audio 510 into scene 4 of Title C 508. The special effects 503, 505, 510 specified for each of the respective titles 504, 506, 508 are also stored in an editing file to be used during playback of the titles 504, 506, 508. The editing file may then be uploaded by the user for others to view the compilation authored by the user involves the various titles 504, 506, 508. As a non-limiting example, the user may upload the editing file via the Internet to a website in which a community of users are members of.

The bottom of FIG. 5A shows a combiner 510 which combines each of the selected scenes from the respective titles 504, 506, 508 into a single output to be displayed. The top of FIG. 5B illustrates the scenes combined into a single output 515. The output 515 comprises scene 7 from Title A 504 with the customized subtitles 503 incorporated 516. The output 515 further comprises scene 2 from Title B 508 with customized graphics 505 incorporated 518, and scene 4 from Title C 508 with customized audio 510 incorporated 520.

The time durations 530, 532, 534 are shown to illustrate that the output 515 may be comprised of the various scenes 516, 518, 520 combined in a contiguous fashion. It should be noted, however, that the scenes 516, 518, 520 may also be separated by other content (e.g., customized slide describing the upcoming scene). The combined scenes 516, 518, 520 with special effects incorporated are output to a display 536 for viewing purposes. It should be emphasized that in accordance with exemplary embodiments, the original titles 504, 506, 508 themselves are never modified. Finally, as noted earlier, the special effects 503, 505, 510 specified by the user are stored in an editing file 538 for future playback. The editing file 538 is associated with each of the respective titles 504, 506 508. The editing file 538 may then be uploaded for other users to use in order to view the compilation authored by the user. As a non-limiting example, a user incorporates customized graphics and subtitles into the first fight scene in the movie "Gladiator." The editing file 538 is linked or associated with the movie title and stores the customized graphics and subtitles. During future playback, the editing apparatus 102 in FIG. 1 reads both the editing file 538 and the associated movie title and incorporates the special effects. The movie "Gladiator," however, is left unmodified.

Figure 6:
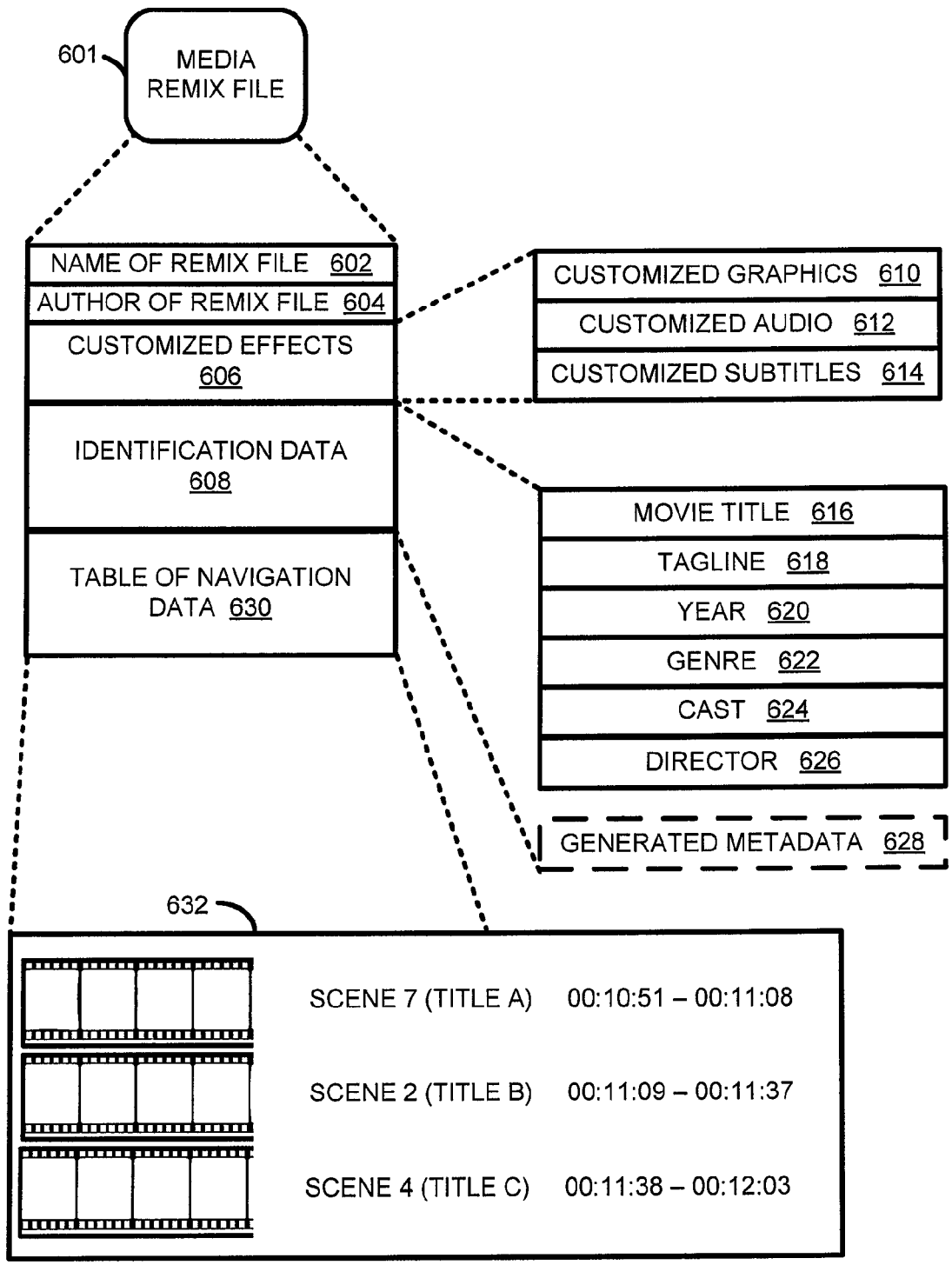
FIG. 6 illustrates an embodiment of an editing file generated by the editor in FIG. 2.

Reference is made to FIG. 6, which illustrates an embodiment of an editing file generated by the editor in FIG. 2. It should be noted that the embodiment described below is just one of many possible embodiments of the remix file or editing file 601. The description of the editing file 601 should not be construed as limiting the present disclosure, but instead is only intended to be exemplary in nature. The editing file 601 may generally be partitioned into multiple blocks, which include the name of the remix file 602, the author of the remix file 604, the customized effects 606, and the identification data 608. The customized effects 606 may include, for example, customized graphics, 610, customized audio, 612, and customized subtitles 614. As discussed earlier, the identification data 608 may be utilized to identify particular media content in the event that a search is performed. The identification data 608 may be comprised of various attributes associated with the particular movie title. These attributes may include, for example, the movie title 616, a tagline 618 commonly associated with the movie title 616, the year 620 in which the movie was released, genre 622 (adventure, romance, action, etc.), cast 624 (e.g., main actors or actresses), and the director 626 of the movie title. It should be noted that the list of attributes discussed above is not an exhaustive list and is merely provided for illustrative purposes.

In accordance with some embodiments, the remix/editing file 601 may further include a table 630, which defines the title, navigation information (e.g., starting time/ending time of the scene), events, starting time/ending time of the events with respect to the scene 632. The desired scenes and events are listed in order. The editing apparatus 102 in FIG. 1 performs playback of the scenes/events in sequence. In the example shown in FIG. 6, scene 7 of Title A is played, followed by scene 2 of Title B, followed by scene 4 of Title C.

In preferred embodiments, the fingerprint is generated based on the title information relating to the media content (e.g., title length) and chapter information (e.g., chapter length, chapter number). The fingerprint may also be generated based on video/audio attributes associated with the particular media content and disc attributes such as the region code. In accordance with other embodiments, the identification data 608 may also be comprised of metadata 628 specified or identified by the user when the user is creating the media remix file/editing file 132.

For purposes of nomenclature used herein, the term metadata broadly refers to any information regarding data such as a video, for example. In this respect, metadata may describe a video and may be utilized in a wide variety of ways. As non-limiting examples, metadata might contain miscellaneous information about a given video such as the chapter list, content rating (e.g., General (G), Parental Guidance (PG), PG-13, Restricted (R)), performers (actors, actresses, musicians, etc.), and a brief synopsis of the movie. Other non-limiting examples include a unique ID assigned to the video, which may comprise a serial number assigned to the video by the author, a serial number assigned by the content provider, and a serial number assigned by a community of viewers. In this regard, the generated metadata 628 may be based on any one or combination of attributes described earlier. However, generated metadata 628 may also comprise other attributes identified by the user. This may comprise, for example, information relating to scene transitions, information relating to the audio content, etc. As described herein, the identification data 608 is used to uniquely identify matching media content and is embedded within the editing file 601.

Figure 7:
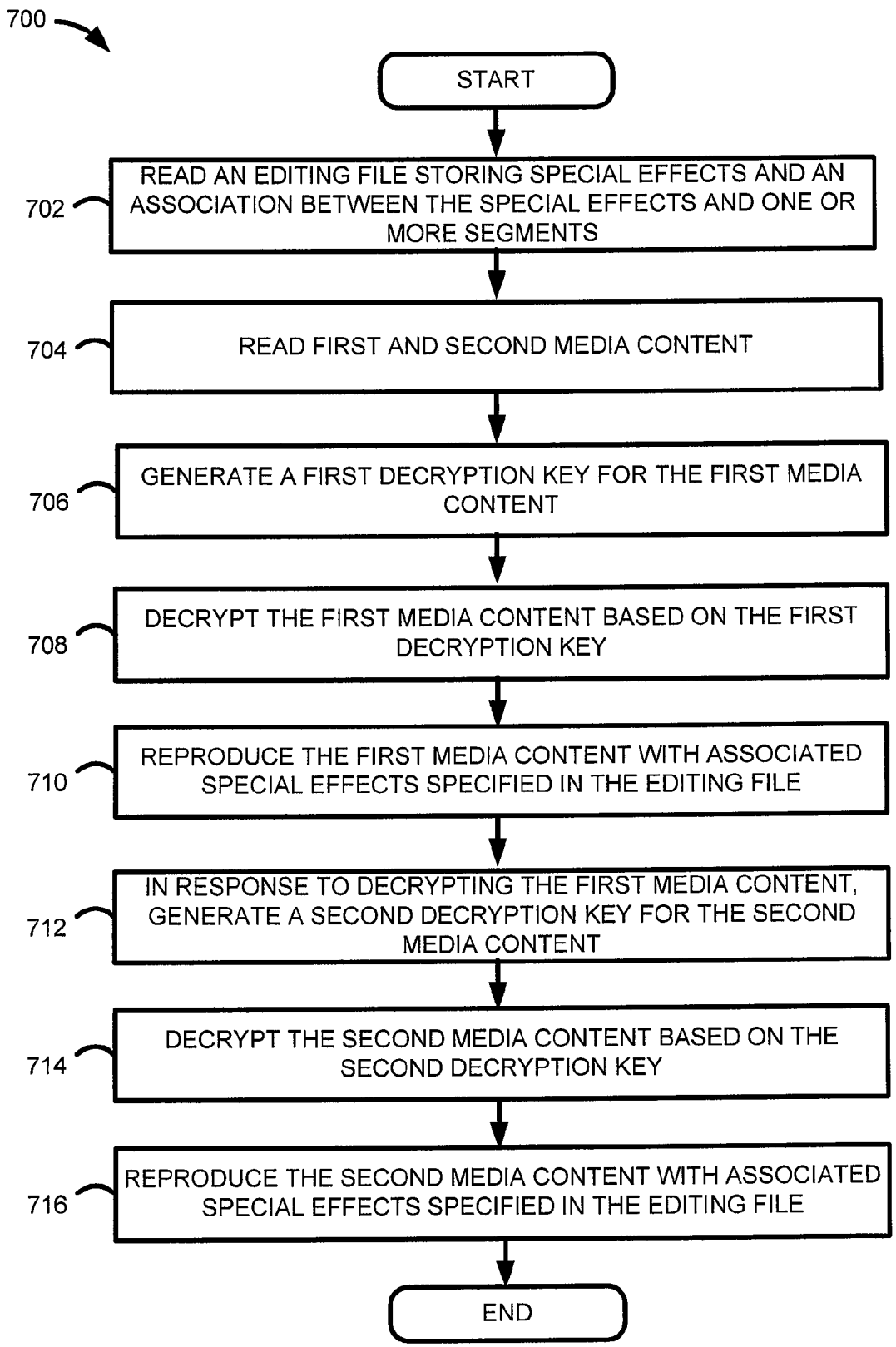
FIGS. 7-8 depict alternative embodiments for editing media content from multiple sources using the apparatus depicted in FIGS. 1-3.
Figure 8:
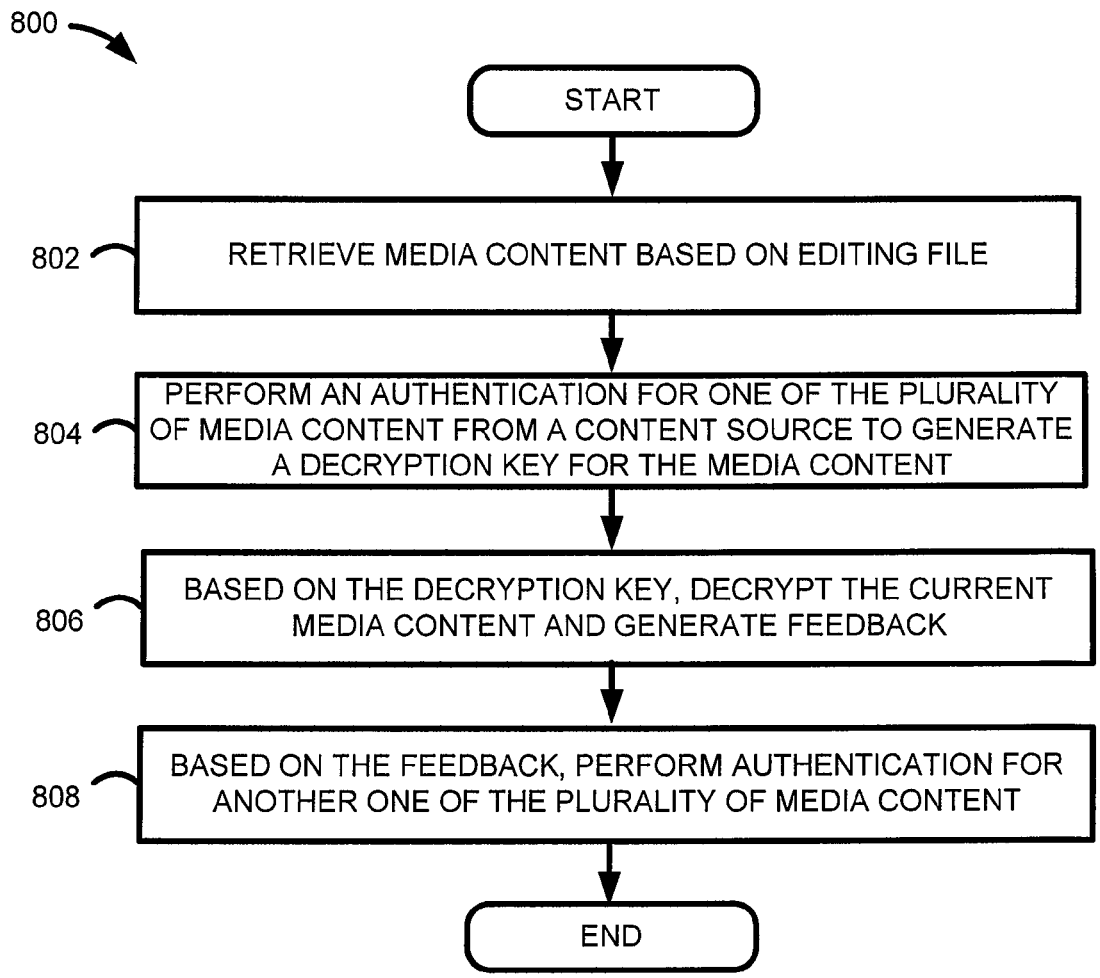

Reference is made to FIGS. 7-8, which depict alternative embodiments for editing media content from multiple sources using the apparatus depicted in FIGS. 1-3. With reference to FIG. 7, block 702 begins by reading both an editing file that contains special effects and an association between the special effects and one or more segments of a plurality of specified media content. During playback of the one or more segments, the special effects stored in the editing file are incorporated into the segment. The specified media content comprises at least a first media content and a second media content. In block 704, the first and second media content are read. In block 706, a first decryption key is generated for the first media content, and in block 708, the first media content is then decrypted using the first decryption key. In block 710, the first media content along with the associated special effects are reproduced. It should be noted that the media content itself is left unmodified, however.

In response to decrypting the first media content, a second decryption key is generated for the second media content (block 712). In block 714, the second media content is then decrypted using the second decryption key. In block 716, the second media content is reproduced with associated special effects. Again, the media content itself is left unmodified. To ensure seamless playback of the plurality of media content, the steps of retrieving the media content, performing authentication, decrypting, combining (segments with corresponding special effects), and reproducing media content are carefully monitored and controlled between the plurality of media content. In accordance with some embodiments, the steps may be performed concurrently or in a staggered fashion.

With reference to FIG. 8, an embodiment is described for performing seamless playback of a plurality of media content. Block 802 begins by retrieving one of a plurality of media content. The media content is retrieved based on a sequence defined in a editing file. In block 804, authentication is performed for one of the plurality of media content to generate a decryption key for the media content. Based on the decryption key, the current media content is decrypted and feedback is generated (block 806). Feedback generated during the decryption stage may comprise any one (or combination) of the following types of information. The generated feedback information may reflect, for example, whether playback of selected segments within the current media content has been performed. Feedback from the decryption stage may also reflect whether a buffer utilized for storing decrypted media content is filled (or to what degree the buffer is filled). This provides another indication of whether playback of a current media content has been performed. In particular, for some embodiments, authentication for the next media content is given high priority when the buffer holding the current media content is full because in such scenarios, the system has the resources available to execute in advance the authentication phase or the retrieving step. However, authentication for next media content is typically assigned the highest priority when decryption of the current media content is about to be completed. Under this scenario, the retrieving step and the authentication for next media content should be executed as soon as possible in order to maintain seamless playback across the plurality of media content.

Based on the feedback, authentication is performed for the current media content (block 808). As described above, authentication for the current media content may be based on whether playback of a prior decrypted media content has been performed or is near completion in order to provide seamless playback among the plurality of media content. If playback of the prior decrypted media content is near completion, authentication for the next media content is performed. As an illustration, suppose three media files are retrieved for playback. Authentication of the second media file may be based on whether playback of the first media file has been performed or is near completion. Likewise, authentication of the third media file may be based on whether playback of the second media file has been performed or is near completion. During authentication of the second media file, feedback is generated. Based on this feedback associated with the second media file, authentication of the third media file is performed.

Thus, in accordance with preferred embodiments, the reproduction of media content includes at least the following steps: retrieving the media content from among a plurality of media content, generating a decrypted key for the retrieved content (i.e., the authentication process), decrypting the content using the unique decrypted key, and combining the decrypting content with the specific effects specified in the editing file. In accordance with such embodiments, the steps above may be embodied in a program stored on a computer readable medium executed by a processor. With reference back to FIG. 2, preferred embodiments may also comprise a control unit 238 configured to monitor the progress of each step for each media content. Based on the progress of each step, the control unit 238 optimizes the execution sequence of the steps for the processor. As an example, the authentication phase of the current media content is executed based on the feedback of the decryption of the prior media content. As another example, the steps for processing content A and the steps for processing content B may be executed in parallel under the direction of the control unit 238.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. An apparatus for incorporating special effects into media content, comprising:
   a media reader configured to read a plurality of media content from a server;
   an editor configured to:
   receive special effects specified by a user for the plurality of media content;
   generate an association that associates the received special effects with one or more segments within the plurality of media content; and
   store the received special effects and the association in an editing file, the editing file not including the media content, and
   a combiner configured to perform seamless playback by incorporating the received special effects into the plurality of media content from the server and consolidating the plurality of media content into a single presentation, wherein the single presentation is viewable without being stored in non-volatile storage, wherein the plurality of media content is unmodified during incorporation of the received special effects.

2. The apparatus of claim 1, wherein the editor is further configured to associate the editing file with each of the plurality of media content.

3. The apparatus of claim 1, wherein the editor is further configured to receive customized subtitles, customized graphics, and customized audio.

4. The apparatus of claim 1, wherein the media reader is further configured to receive one or more of the following: a DVD, a High Definition DVD (HD-DVD), a BLU-RAY Disc, and a managed copy of each of the plurality of media content.

5. The apparatus of claim 4, wherein the media reader is further configured to perform a secure download of managed copies over the Internet.

6. The apparatus of claim 5, wherein the media reader is configured to remove any managed copies after playback of the single presentation generated by the combiner.

7. The apparatus of claim 1, further comprising a controller configured to manage execution of the media reader, the editor, and the combiner for the processing the plurality of media content, wherein the media reader is further configured to perform a secure download of managed copies.

8. A method for incorporating special effects into a plurality of media content, comprising:
- receiving, by a computing device, a plurality of media files from a server;
- receiving, by the computing device, special effects corresponding to each of the plurality of media files, the special effects being contained in an editing file that does not incorporate the plurality of media files; and
- based on the received plurality of media files from the server and the special effects for each of the plurality of media files, seamlessly playing back, by the computing device, a single presentation, wherein the single presentation is viewable without being stored in non-volatile storage, and wherein the plurality of media files is unmodified during incorporation of the received special effects.

9. The method of claim 8, further comprising:
- storing the received special effects in the editing file;
- associating the received special effects with one or a plurality of segments within the plurality of media files; and
- storing the association in the editing file.

10. The method of claim 8, wherein receiving a plurality of media files comprises one or more of the following:
- receiving the plurality of media files from a storage medium;
- performing a secure download of managed copies of the plurality of media files over the Internet; and
- receiving managed copies from a local hard disk drive.

11. The method of claim 10, wherein the storage medium comprises at least one of: a DVD, a High Definition DVD (HD-DVD), and a BLU-RAY Disc.

12. The method of claim 10, further comprising removing any managed copies after playback of the single presentation is completed.

13. The method of claim 10, wherein seamlessly playing back the single presentation comprises:
- incorporating the specified special effects into the plurality of media files; and
- consolidating the plurality of media files to produce the single presentation.

14. A system for incorporating special effects into media content, comprising:
- a network interface configured to receive media content over a network and store managed copies of the received media content locally, wherein managed copies comprise controlled copies of the media content; and
- a computer processor configured to:
  - receive specified special effects for the media content from an editing file, the editing file not including the media content; and
  - perform seamless play back of a single presentation on a display based on the received media content and the specified special effects, wherein the single presentation is viewable without being stored in non-volatile storage, and wherein the media content is unmodified during incorporation of the special effects.

15. The system of claim 14, wherein the media content is unmodified while the single presentation is being displayed.

16. The system of claim 14, wherein the media content is stored on optical storage media, wherein the optical storage media comprises at least one of: a DVD, a High Definition DVD (HD-DVD), and a BLU-RAY Disc.

17. The system of claim 14, wherein the processor is further configured to store the specified special effects in the editing file and associate the editing file with the media content.

18. The system of claim 14, wherein the processor is further configured to remove any managed copies downloaded by the network interface after the single presentation is displayed.

19. The system of claim 14, wherein the network interface is further configured to retrieve managed copies from a computer system coupled to the network, wherein the network is the Internet.

20. An apparatus for playing back special effects into media content, comprising:
- an editing file reader configured to read an editing file, wherein the editing file stores a fingerprint for identifying at least one specified media content, special effects, and an association with a plurality of segments of the at least one specified media content, wherein the fingerprint is transmitted to a server, the fingerprint uniquely identifying the at least one specified media content, and wherein the at least one specified media content is received upon authorization from the server and is not stored in the editing file;
- a media reader configured to receive the at least one specified media content from the server; and
- a combiner configured to seamlessly play back single presentation based on the at least one received specified media content containing the plurality of segments, wherein the at least one received specified media content is not stored in the editing file, wherein the special effects are stored in the editing file, wherein the single presentation is viewable without being stored in non-volatile storage, and wherein the at least one received specified media content is unmodified.

21. The apparatus of claim 20, wherein the editing file reader is further configured to read navigation information from the editing file, wherein the navigation information specifies a start time and an end time of a segment in which the special effects are to be incorporated.

22. The apparatus of claim 21, wherein the combiner is further configured to generate the single presentation based on the navigation information in the editing file.

23. The apparatus of claim 20, further comprising a controller configured to manage execution of the editing file reader, the media reader, and the combiner for the processing the media content.

24. A method for playing back special effects into media content, comprising:
- reading, by a computing device, an editing file storing special effects and an association with a plurality of specified media content, the editing file not including the plurality of specified media content;
- transmitting, by the computing device, a fingerprint to a server, the fingerprint uniquely identifying the plurality of specified media content;
- receiving, by the computing device, authorization from the server;
- upon receiving authorization, receiving, by the computing device, the plurality of specified media content;
- based on the editing file, identifying, by the computing device, the plurality of specified media content specified by the editing file;
- reading, by the computing device, the plurality of specified media content; and seamlessly playing back, by the computing device, a single presentation based on the special effects stored in the editing file and the association with the plurality of specified media content, wherein the plurality of specified media content is unmodified, wherein seamlessly playing back the single presentation comprises concurrently decrypting each of the plurality of specified media content, and wherein the single presentation is viewable without being stored in non-volatile storage.

25. A method for reproducing special effects into media content, comprising:
reading an editing file storing special effects and an association between the special effects and one or more segments of a plurality of specified media content, wherein the plurality of specified media content comprises at least a first media content and a second media content, the editing file not including the plurality of specified media content;
reading the first and second media content;
generating a first decryption key for the first media content;
decrypting the first media content based on the first decryption key;
playing back the first media content with associated special effects;
in response to decrypting the first media content, generating a second decryption key for the second media content;
decrypting the second media content based on the second decryption key; and
playing back the second media content with associated special effects, wherein the first media content with associated special effects and the second media content with associated special effects are viewable without being stored in non-volatile storage, and wherein the first media content and the second media content are unmodified.

26. The method of claim 25, wherein generating the second decryption key is performed prior to the playing back of the first media content being completed.

27. The method of claim 25, wherein the plurality of specified media content is read from a local storage medium.

28. The method of claim 25, wherein the plurality of specified media content is read from a server.

29. The method of claim 28, further comprising transmitting a fingerprint to the server to retrieve one of the plurality of specified media content, wherein the fingerprint uniquely identifies the one of the plurality of specified media content.

30. The method of claim 29, further comprising:
receiving authorization from the server; and
upon receiving authorization, receiving the plurality of specified media content.

31. The method of claim 29, further comprising:
transmitting navigation information specifying a particular segment within the plurality of specified media content to be received;
receiving authorization from the server; and
upon receiving authorization, receiving the segment of the specified media content.

32. The method of claim 30, further comprising:
in response to not receiving the first media content, performing at least one of:
displaying the fingerprint; indicating that the plurality of specified media content could not be located; and
bypassing the step of reproducing the plurality of specified media content and the associated special effects.

33. A method for reproducing a plurality of media content, comprising:
retrieving the plurality of media content;
performing, by a computing device, authentication for one of the plurality of media content from content sources to generate a decryption key;
based on the decryption key, decrypting, by the computing device, one of the plurality of media content and generating feedback; and
based on the feedback, performing, by the computing device, seamless playback of the plurality of media content with corresponding special effects as a single presentation, wherein the single presentation is viewable without being stored in non-volatile storage, and wherein the plurality of media content is unmodified.

34. The method of claim 33, wherein performing seamless playback comprises:
based on the feedback, assigning priorities to the steps of retrieving, performing authentication, and decrypting for another one of the plurality of media content; and
based on the assigned priorities, performing the steps of retrieving, performing authentication, and decrypting for another one of the plurality of media content.

35. The method of claim 33, wherein the feedback generated during the decrypting step comprises a degree of fullness of a buffer for storing the decrypted media content.

36. The method of claim 33, wherein the feedback generated during the decrypting step comprises a playback ratio, wherein the playback ratio indicates a degree of fullness of a buffer storing prior decrypted media content.

37. The method of claim 33, wherein the one of the plurality of media content is retrieved from a local storage medium.

38. The method of claim 33, wherein the one of the plurality of media content is retrieved from a server.

39. The method of claim 38, further comprising transmitting a fingerprint to the server, wherein the fingerprint uniquely identifies the one of the plurality of media content.

40. The method of claim 39, further comprising:
receiving authorization from the server; and
receiving the one of the plurality of media content corresponding to the fingerprint upon receiving authorization.

41. The method of claim 33, further comprising:
transmitting navigation information specifying a segment of one of the plurality of media content from among the plurality of media content;
receiving authorization from the server; and
upon receiving authorization, receiving the segment of the one of the plurality of media content corresponding to the fingerprint and navigation information.

* * * * *